Patented Apr. 7, 1942

2,279,202

UNITED STATES PATENT OFFICE 2,279,202

CHEESE COMPOSITION

Albert Musher, New York, N. Y., assignor to Musher Corporation, New York, N. Y., a corporation of New Jersey No Drawing. Application November 27, 1939, Serial No. 306,344

8 Claims. (Cl. 99—117)

The present invention relates to cheese compositions and it particularly relates to grated cheese compositions. Although not specifically limited thereto the present invention will be described in connection with its application to grated, flaked, or otherwise comminuted hard cheeses such as, for example, Parmesan cheese, Parmisello cheese, American cheese, and Edam cheese. It also has application to cheeses such as Roquefort cheese and even, in some instances, to soft cheese.

When hard cheeses as, for instance, Parmesan cheese is grated, it is found that in this form they are readily subject to deterioration, which may take the form of drying out, discoloring, molding, loss of flavor, hardening, or other forms of deterioration.

Attempts have been made to avoid or minimize this loss of flavor, mold growth, or other deterioration by partially dehydrating the cheese, but this too has been found to result in deterioration of the flavor, or has not produced the best desired results.

It is therefore among the objects of the present invention to provide an improved grated cheese composition in which the grated cheese, even without dehydration, will retain a high quality without the usual loss of flavor, or will retain other desirable qualities even though it is stored for relatively long periods of time, and even though it may be exposed to air, or to moisture, or though it may be wrapped in paper wraps which are not necessarily hermetically sealed.

Cheese contains butterfat which at room temperature or warm temperatures becomes soft or plastic, or which melts into a relatively fluid condition. Therefore, there results fat seepage from cheese, particularly when the cheese is kept at room temperature or warm temperatures. This fat seepage stains the cheese wrapper, and also causes the development of rancidity and off-flavors by the exposure to the air of thin films of fat on the wrapper.

It is therefore among the objects of the present invention to provide an improved food composition with a substantially lessened tendency towards seepage of the butterfat therefrom, and with a lessened tendency towards deterioration such as the development of rancidity or other forms of deterioration due to the fat seepage therefrom.

Still another object of the present invention is to provide a cheese composition which will be in a solid, non-grated form but which composition can be very readily and very quickly formed into grated cheese particles without the necessity for laboriously grating the cheese in the customary manner.

Another object is to provide a cheese composition which will permit a ready preparation of cheese sauces by the consumer without the necessity for measuring the various amounts of cheese and other ingredients that are required, and with improved cooking or preparing qualities.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accomplishing the above objects it has been found most satisfactory to grate hard cheeses, generally, as for example, Parmesan cheese, having present its natural amount of moisture, which ranges for instance between about 25% or 30% to about 35% or 50%, and then combining the grated cheese with a molten hard fat, the mixture being of such a nature so as to result in a coating of substantially all of the particles of the grated cheese with the molten hard fat, and then allowing the hard fat to congeal thereon. While the hard fat may be mixed with the grated cheese while the fat is in a softened or plastic condition it is generally preferable to have the molten hard fat in a liquid or entirely melted condition so as to enable a more thorough coating and covering of the individual cheese particles.

Although plastic fats may sometimes be utilized, either in their plastic or molten form, it has been found most satisfactory to utilize hard fats which are relatively non-plastic and which are substantially rigid at room temperature, and generally the fats should preferably have a melting point of between about 95° F. and 125° F., although not limited thereto. Among the many types of fats which may be utilized are palm kernel stearin, hydrogenated cottonseed oil, corn oil, oleostearin, oleo oil, palm oil, peanut oil, sesame oil, cocoanut oil, cocoanut oil stearin, babassu nut oil, etc., or combinations of these or other fats and oils.

Generally the preferred type of fat used is a fat of the general type of palm kernel stearin, particularly of a melting point ranging, for example, from about 105° F. or 110° F. to about 115° F. or 120° F. Fats of this general type have among other advantages, the advantage that they melt rather quickly when placed on hot foods or in hot water, but at the same time they present a substantially solid and durable condition when in briquetted form.

Where liquid oils are used the end fat product should be a hydrogenated or otherwise hardened product so as to be of the required plastic or hard melting point.

The fat may be mixed with the grated cheese in the desired proportions, as, for example, in amounts ranging from 1 to 5 parts of fat for every 10 parts of the cheese, or, up to equal mixtures, or higher quantities of the fat may be used with the cheese in whatever proportions are required. It is generally desirable to have the fat and the cheese in such proportions so that it will be possible to compact the mixture into a hard, firm unit or briquette which will nevertheless readily disintegrate into grated particles of cheese when this solid unit is placed into hot water or when it is mixed with hot foods such as spaghetti, eggs, boiled rice, or potatoes, or when it is placed in soup, and so forth.

Although briquetting is preferred, it is also possible to obtain a flaked, grated, or pulverulent cheese combination in which the fat surrounds the individual flakes or particles of cheese, but which fat coated cheese particles have not been compacted together, but remain in more or less of a flaked or pulverulent condition.

The fat, if desired, may contain or be combined with various types of materials such as spices, salt, skim milk powder, or with various spices or flavors so as to give the final cheese sauce, after preparation by the consumer, the desired taste or flavor.

Where the product is to be made into a sauce as, for instance, for au gratin use, and where it is desired to obtain a homogeneous, or relatively smooth mixture, it has been found that it is very desirable to incorporate in, or to combine with the fat, a finely divided homogenizing agent such as, for example, cornstarch, tapioca flour, gum tragacanth, gum arabic, locust bean gum, pectin, flour, gelatin, agar agar, and so forth. These materials will cause the fat and cheese mixture to form a homogeneous mixture when the final sauce is prepared with water, liquid milk, or with other liquid materials. Where materials such as cornstarch or wheat flour are used, cooking is generally necessary, but where materials such as gum tragacanth or gum arabic are used, merely mixing with a hot or boiling liquid to melt the fat, is sufficient.

It is also possible to combine with the fat, various materials which may enhance, preserve, or otherwise improve the cheese flavor, fat seepage, or other characteristics of the finished product. An example of such a material is, for instance, skim milk powder. The skim milk powder not only acts to enhance the smoothness of the finished product, but it also aids in absorbing and taking up some of the butterfat present in the cheese, particularly as this butterfat tends to seep or ooze out. Other powdery, absorbent materials such as flour likewise offer this advantage. Also, the powdered skim milk aids materially in the development or enhancement of the cheese flavor and in the development of creaminess in the finished product.

Instead of mixing all of the fat with the grated cheese in one mixture, the fat may be applied in two or more layers or coatings on the cheese particles. The flour or milk powder, for example, may be mixed with a portion of the molten hard fat and then this combination intimately mixed with the grated cheese particles and allowed to congeal thereon, while maintaining the fat coated cheese particles in a relatively non-compacted or flake condition.

Thereupon these fat coated cheese particles may be mixed with a further quantity of the molten fat which may be the same or of a different type of fat. This super-imposed layer may be entirely fat or it may contain within it other ingredients as for instance, salt. The finished product may be shaken so as to have it remain in a relatively non-compacted condition, or it may be compacted into a solid unit or briquette.

By utilizing such a process involving different layers of fat, various advantages may accrue such as better absorption of fat seepage which may be produced by concentrating the amount of flour or powdered milk around the cheese particles, or, antioxidants, flavor preservatives, etc., may be made to come into closer contact with the actual grated cheese particles, or, various pro-oxidants or other materials may be placed in the super-imposed layers so as to come into substantially less contact with the actual cheese particles, where this is desired. In the same way, so as to enable the briquette, in many cases, to disintegrate in hot water or hot liquid more quickly, the grated cheese may be first coated with a layer of plain fat, or with a layer of fat which does not contain materials that are inclined to become gummy or adhesive when the hot water or hot food contacts it.

Also, the various layers of fat that may be placed on the particles of cheese may have different melting points or may be of different types of fat. For example, the fat coating that contacts the grated cheese pieces may be of a lower melting point, and the fat which is used to compact the fat coated cheese pieces may be of a higher melting point, or the procedure may be reversed, as desired.

Further, the finished briquette may be dipped into molten hard fat which is then allowed to congeal thereon so as to form a protective film over the entire briquette. This, particularly where there is a relatively small amount of fat in the briquette itself, gives substantially improved qualities to the briquette from the standpoint of durability, moisture-proofness and air-proofness.

Example I

An example of a grated cheese briquette follows: Parmesan cheese is grated and 45 grams, or possibly 60 grams of this grated cheese is intimately mixed with 30 grams of palm kernel stearin of about 110° F. to 115° F. melting point, the fat having been heated to a temperature of about 190° F. prior to being mixed with the grated cheese so as to cause a substantially thorough coating for the grated cheese particles. This combination is thoroughly mixed together and is then placed into molds as desired, and is then hardened either at room temperature or chilled.

Example II

Where it is desired to produce a briquette which may be utilized to form a cheese sauce, one formula and procedure that may be used is to melt 60 grams of palm kernel stearin of a melting point of about 110° F. to 115° F., and to heat it to a temperature of 200° F., and then, at this temperature, to add to this molten hard fat a thorough mixture that has previously been made of 70 grams of grated Parmesan cheese, 26 grams of cornstarch, 6 grams of salt, and 60 grams of powdered skim milk. This combination is mixed thoroughly and then placed into molds of the desired shape and size so as to congeal into substantially hard units. Specific quantities of this cheese combination may be placed into each mold, so that each briquette will be of the proper proportion to be mixed with a given quantity of water or other liquid so as to facilitate the preparation of the final cheese sauce by the consumer.

In the making of the final cheese sauce a briquette weighing 60 grams, for example, may be cooked with one-half cup of water (4 fl. oz.) until the mixture begins to thicken. The resultant product is an au gratin sauce in which there is present the grated cheese, powdered milk, salt, and all other required ingredients, without there being necessary the usual laborious grating of the cheese, or the measuring or preparation of the ingredients.

Where it is desired to prepare a cheese sauce briquette which may be prepared without boiling, about 8 or 9 grams of locust bean gum may be used in place of the cornstarch in the formula given above. Instead of boiling this type of briquette with water, all that is necessary is to add the boiling water to the brick and to stir together until the fat melts and the composition thickens.

Particularly where a sufficient amount of fat is used, it may not be necessary to compress the materials so as to form briquettes. In other cases, however, compression may be necessary or desirable, although, wherever possible, a lighter compression rather than a very heavy compression is generally desired so as to produce quicker disintegration when the briquette is placed on hot foods, and particularly when the briquette is made so as to be cooked into a sauce or dressing with water or other liquids.

In the preparation of the briquettes of this invention, it is in many cases desirable to have the briquette in a relatively thin or narrow, flat form so that the hot water or hot liquid may more easily and more readily attack the fat so as to form a quicker and more thorough melting of the fat and thereby facilitate the disintegration of the briquette into a smoother finished product.

It is possible to provide a quick chill for the fat coated cheese particles or the briquettes immediately after the molten hard fat has been mixed therewith. This is particularly desirable where it is wished to have the fat penetrate as little as possible into the cheese, or where it is desired to keep the cheese from being exposed to the high temperature of the fat for any period of time.

On the other hand, it is advisable at times to permit the fat coated cheese particles or the briquettes to cool gradually, or it is even at times advisable to permit the fat to remain hot or warm for extended periods of time so as to have the fat penetrate into the cheese, or so as to develop various characteristics as, for instance, a retention of softness in the cheese particles, a partial or complete melting of the cheese particles to enable more intimate mixing with the fat, better adhesiveness of the fat to the cheese pieces, the absorption of cheese flavor into the fat or into other ingredients that compose the composition, or so as to develop other characteristics. In fact, it is in many instances preferred to apply the fat to the cheese, or to the mixture of the dry ingredients containing the cheese, at relatively high temperatures, although care must be taken not to burn or char any of the ingredients that are included. Or, where it is desired, the fat may be maintained at the required temperature as, for instance, at 130° F. to 140° F., or even at a temperature of, for instance, about 160° F. or 170° F. for the required period of time necessary to produce the desired result.

If desired, in the preparation of the briquette of this invention, a paper or other covering may be adhesively and closely contacted with the briquette by applying this wrap on the top or bottom or around the unit before it is entirely congealed, or by placing the wrap on the briquette and then running a warm iron over it, so as to soften the fat, or similar procedures may be used. This has the advantage of further protecting the keeping quality of the ingredients of the briquette.

It is generally desirable or preferred in producing the cheese compositions of this invention to use Parmesan cheese or high flavored cheeses as contrasted to the less highly flavored and particularly as contrasted with mild cheese. In the utilization of the highly flavored cheeses, particularly when they are in grated or flaked form, these stronger flavors are retained substantially better because of the protected condition that is produced by this invention.

Where it is desired, the cheese that is used for producing the compositions for this invention may be dehydrated to, for instance, 12% to 14% moisture or to about 18% to 22% moisture, or to whatever moisture content is desired.

Where the flavor is produced by enzymes or molds, as in the case of cheese, an advantage of this invention is that the fat, particularly when it is applied and generally maintained for the required period of time at sufficiently high temperatures, will have the effect of stopping or holding or possibly delaying the ripening or further flavor development of the cheese by retarding or stopping further mold or enzymic action.

Another advantage of this invention is that grated cheese may now be kept without refrigeration or with less refrigeration in a better condition than heretofore possible when grated cheese was stored in its usual grated form.

A still further advantage of this invention is found in the fact that when the cheese composition is melted on a hot potato, or hot spaghetti, or hot rice, for example, the fat, as it melts, will have a tendency to cause the grated cheese to be more easily and thoroughly mixed with the food. Also, particularly when the fat has taken up at least a part of the cheese flavor, this fat will carry an improved cheese flavor throughout the entire food with which it is mixed.

Although the grated cheese is preferably bonded into substantially solid units by the use of fat as herein described, nevertheless, other quickly disintegratable bonding agents may be used to produce different bonding or disintegrating characteristics as for example, sugar, and particularly non-crystallizable sugars as, for example, glucose, invert sugar, and so forth. Where the various sugar syrups are used as the bonding agents they should be thoroughly mixed with the grated cheese and should then be molded or formed as desired, and then allowed to dry either at room temperature or at a warm temperature as for example at a temperature of 110° F., so as to form a substantially hard unit.

By way of example, a glucose of 40° Baumé may be heated to 140° F. or 150° F. so as to thin it, and then the grated Parmesan cheese added and mixed therewith in the proportion, for example, of one part of glucose to 3 parts grated Parmesan cheese. Various ingredients such as salt, for example, may be mixed with the glucose if desired before admixture with the cheese materials.

Preferably, however, when sugar syrups are used for the bonding agent, the grated cheese should first be combined with a molten hard fat which is caused to congeal on the grated cheese particles, as described herein, and then the relatively separated coated cheese particles mixed together with the sugar syrup. In this event, care should be taken not to have the glucose syrup too high in temperature when mixed with the coated grated cheese particles as this tends to cause the melting of the fat coating thereon. Powdered milk, or other ingredients may be added as desired to the molten hard fat when it is applied to the cheese particles, in accord with the procedures herein described.

An advantage of combining grated cheese particles with fat prior to admixture with the sugar syrup is that the fat coating surrounding the grated cheese particles substantially protects these cheese particles from coming into direct contact with the aqueous sugar syrup. Thereby caking of the cheese particles is substantially reduced or eliminated.

In some cases, if desired, the finished briquette composed of fat coated cheese particles which have been bonded together by the sugar syrup, may be placed into an incubator, preferably at the temperature of the melting point or just a little above the temperature of the melting point of the fat used therein, and these briquettes may be kept at this temperature for a period of time, for example, of about 15 minutes to 35 or 40 minutes to partially melt a portion of the fat coating of the cheese particles and to cause the fat on the various particles to unite to some degree within the briquette so as to cause more or less of a lamination or skeleton structure therein and thereby so as to materially strengthen the durability of the briquette. This treatment generally should take place after the sugar syrup has largely or at least partially dried.

In many cases, the use of sugar as compared with fat briquetting produces even quicker disintegration of the grated cheese particles when placed in or cooked with hot water or other hot liquids. Obviously, the use of sugar binders is not preferred or generally feasible where the grated cheese briquettes are not placed into hot liquids, but are merely placed on hot foods. In such cases, when fat is the binder, this fat comes into direct contact with the hot food and the fat obviously will melt and disintegrate, whereas the same results would not be as fully obtained where sugar is the binder.

The term "grated" as used herein refers to cheese not only in grated condition, but also in flaked, pulverized, powdered, or otherwise comminuted condition.

What I claim is:

1. A cheese composition comprising grated cheese and a fat protective, said protective being coated on substantially all of the individual grated cheese particles, and said grated cheese having a moisture content normal to grated cheese of commerce.

2. A cheese composition comprising grated cheese and a fat binder, said composition being in the form of a substantially solid unit, said solid unit being quickly disintegratable into individual grated cheese particles, and said grated cheese having a moisture content normal to grated cheese of commerce.

3. A cheese composition comprising grated cheese, a fat binder, and a homogenizing agent, said composition being in the form of a substantially solid unit, said solid unit being quickly disintegratable into individual grated cheese particles, said solid unit being preparable into a substantially smooth and homogeneous cheese sauce, and said grated cheese having a moisture content normal to grated cheese of commerce.

4. A process of making grated cheese with substantially improved keeping quality, said process comprising grating the cheese and coating said grated cheese particles with a hard fat, said grated cheese having a moisture content normal to grated cheese of commerce.

5. A process of making a substantially solid unit cheese composition which will quickly disintegrate into individually grated cheese particles upon admixture with a hot food, said process comprising admixing a fat which is non-liquid at room temperature, with grated cheese particles, and then forming or hardening into the required shape and size, said grated cheese having a moisture content normal to grated cheese of commerce.

6. A cheese composition comprising grated cheese and a fat, said fat being coated on substantially all of the individual grated cheese particles, said fat coated, grated cheese particles being bound together into a substantially solid unit by a binder, and said grated cheese having a moisture content normal to grated cheese of commerce.

7. A cheese composition comprising grated cheese and a fat protective, said protective being coated on substantially all of the individual grated cheese particles, the moisture content of the grated cheese being not less than 18%, the grated cheese particles being present in their relatively individual particle condition and said relatively grainy cheese particles being separated from each other by a layer of fat.

8. A cheese composition comprising cheese and a fat, said fat binding the grated cheese particles together into a substantially solid unit, said solid unit being quickly disintegratable into cheese particles upon admixture with hot food materials, the moisture content of the grated cheese being not less than 18%, the grated cheese particles being present in their relatively individual particle condition and said relatively grainy cheese particles being separated from each other by a layer of fat.

ALBERT MUSHER.